United States Patent
Benhase et al.

(10) Patent No.: US 9,430,395 B2
(45) Date of Patent: Aug. 30, 2016

(54) GROUPING AND DISPATCHING SCANS IN CACHE

(75) Inventors: Michael Thomas Benhase, Tucson, AZ (US); Susan Kay Candelaria, Tucson, AZ (US); Lokesh Mohan Gupta, Tucson, AZ (US); Kenneth Wayne Todd, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1042 days.

(21) Appl. No.: 12/189,594

(22) Filed: Aug. 11, 2008

(65) Prior Publication Data

US 2010/0037226 A1 Feb. 11, 2010

(51) Int. Cl.
*G06F 12/08* (2016.01)

(52) U.S. Cl.
CPC ....... *G06F 12/0866* (2013.01); *G06F 12/0804* (2013.01)

(58) Field of Classification Search
None
See application file for complete search history.

(56) References Cited

U.S. PATENT DOCUMENTS

| | | | |
|---|---|---|---|
| 4,332,010 A | 5/1982 | Messina et al. | |
| 4,916,604 A | 4/1990 | Yamamoto et al. | |
| 5,636,359 A * | 6/1997 | Beardsley et al. | 711/122 |
| 5,829,018 A * | 10/1998 | Moertl et al. | 711/113 |
| 5,860,078 A | 1/1999 | Emmot | |
| 6,023,746 A | 2/2000 | Arimilli et al. | |
| 6,085,288 A | 7/2000 | Arimilli et al. | |
| 6,438,657 B1 | 8/2002 | Gilda | |
| 2003/0105928 A1* | 6/2003 | Ash et al. | 711/136 |
| 2003/0149843 A1* | 8/2003 | Jarvis et al. | 711/133 |
| 2003/0225948 A1* | 12/2003 | Jarvis et al. | 710/17 |
| 2004/0260882 A1* | 12/2004 | Martinez et al. | 711/133 |
| 2006/0069888 A1* | 3/2006 | Martinez | 711/162 |

OTHER PUBLICATIONS

Venkata K. Pingali et al. "Restructuring Computations for Temporal Data Cache Locality." Aug. 2003. Plenum Publishing. International Journal of Parallel Programming. vol. 31. pp. 305-338.*
James R. Larus and Michael Parkes. "Using Cohort Scheduling to Enhance Server Performance." Jun. 2002. USENIX. ATC 2002.*
Stavros Harizopoulos et al. "QPipe: A Simultaneously Pipelined Relational Query Engine." Jun. 2005. ACM. SIGMOD 2005.*
Zukowski et al. "Cooperative Scans: Dynamic Bandwidth Sharing in a DBMS." Sep. 2007. ACM. VLDB '07. pp. 723-734.*

* cited by examiner

Primary Examiner — Nathan Sadler
(74) Attorney, Agent, or Firm — Griffiths & Seaton PLLC

(57) ABSTRACT

A method, system, and computer program product for grouping and dispatching scans in a cache directory of a processing environment is provided. A plurality of scan tasks is aggregated from a scan wait queue into a scan task queue. The plurality of scan tasks is determined by selecting one of (1) each of the plurality of scan tasks on the scan wait queue, (2) a predetermined number of the plurality of scan tasks on the scan wait queue, and (3) a set of scan tasks of a similar type on the scan wait queue. A first scan task from the plurality of scan tasks is selected from the scan task queue. The scan task is performed.

9 Claims, 4 Drawing Sheets

GROUPING AND DISPATCHING SCANS IN CACHE

BACKGROUND OF THE INVENTION

1. Field of the Invention

The present invention relates in general to computers, and more particularly to a method, system, and computer program product for grouping and dispatching scans in cache.

2. Description of the Related Art

A storage subsystem may receive Input/Output (I/O) requests directed toward an attached storage system. The attached storage system may comprise an enclosure including numerous interconnected disk drives, such as a Direct Access Storage Device ("DASD"), a Redundant Array of Independent Disks ("RAID" Array), Just A Bunch of Disks ("JBOD"), etc. The storage subsystem may have a cache comprising of one or more gigabytes of volatile storage, e.g., Random Access Memory (RAM), Dynamic Random Access Memory (DRAM), etc. If the storage subsystem receives I/O requests at a rate exceeding the processing capability of the I/O requests at the storage subsystem, the storage subsystem may queue the I/O requests in the cache. A copy of certain modified (write) data may also be placed in the cache. Data may also be automatically prefetched into the cache to quickly satisfy read requests.

The cache may need to be scanned periodically. Scanning a cache may be in response to a host command or may be as a result of automatic error handling behavior activity. During scanning of a cache, the tracks associated with the cache are examined and appropriate actions taken. The appropriate actions may include destage of data from the cache, discarding of data from the cache etc. The appropriate actions may also vary depending on the type of scanning being performed on the cache.

Since the scanning of a cache is a time-consuming operation, particularly when the cache size is large, there is a need in the art for improved techniques for scanning data in cache.

SUMMARY OF THE INVENTION

A need exists for a mechanism to group and dispatch scans in cache more efficiently. Accordingly, in one embodiment, by way of example only, a method for grouping and dispatching scans in a cache directory of a processing environment is provided. A plurality of scan tasks is aggregated from a scan wait queue into a scan task queue. The plurality of scan tasks is determined by selecting one of (1) each of the plurality of scan tasks on the scan wait queue, (2) a predetermined number of the plurality of scan tasks on the scan wait queue, and (3) a set of scan tasks of a similar type on the scan wait queue. A first scan task from the plurality of scan tasks is selected from the scan task queue. The scan task is performed.

In an additional embodiment, again by way of example only, a system for grouping and dispatching scans in a cache directory of a processing environment is provided. A processor is operational in the processing environment. The processor is adapted for aggregating a plurality of scan tasks is from a scan wait queue into a scan task queue. The plurality of scan tasks is determined by selecting one of (1) each of the plurality of scan tasks on the scan wait queue, (2) a predetermined number of the plurality of scan tasks on the scan wait queue, and (3) a set of scan tasks of a similar type on the scan wait queue. A first scan task from the plurality of scan tasks is selected from the scan task queue. The scan task is performed.

In still another embodiment, again by way of example only, a computer program product for grouping and dispatching scans in a cache directory of a processing environment is provided. The computer program product comprises a computer-readable storage medium having computer-readable program code portions stored therein. The computer-readable program code portions comprise a first executable portion for aggregating a plurality of scan tasks from a scan wait queue into a scan task queue, the plurality of scan tasks determined by selecting one of (1) each of the plurality of scan tasks on the scan wait queue, (2) a predetermined number of the plurality of scan tasks on the scan wait queue, and (3) a set of scan tasks of a similar type on the scan wait queue, a second executable portion for selecting from the scan task queue a first scan task from the plurality of scan tasks according to an order, and a third executable portion for performing the scan task.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for grouping and dispatching scans in cache to improve processing performance and, in turn, the overall performance of the processing environment. These embodiments incorporate methodologies for grouping the scans. In one embodiment, a scan task queue is employed in which the scan tasks are taken from. Additional features of these embodiments are further described, following.

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
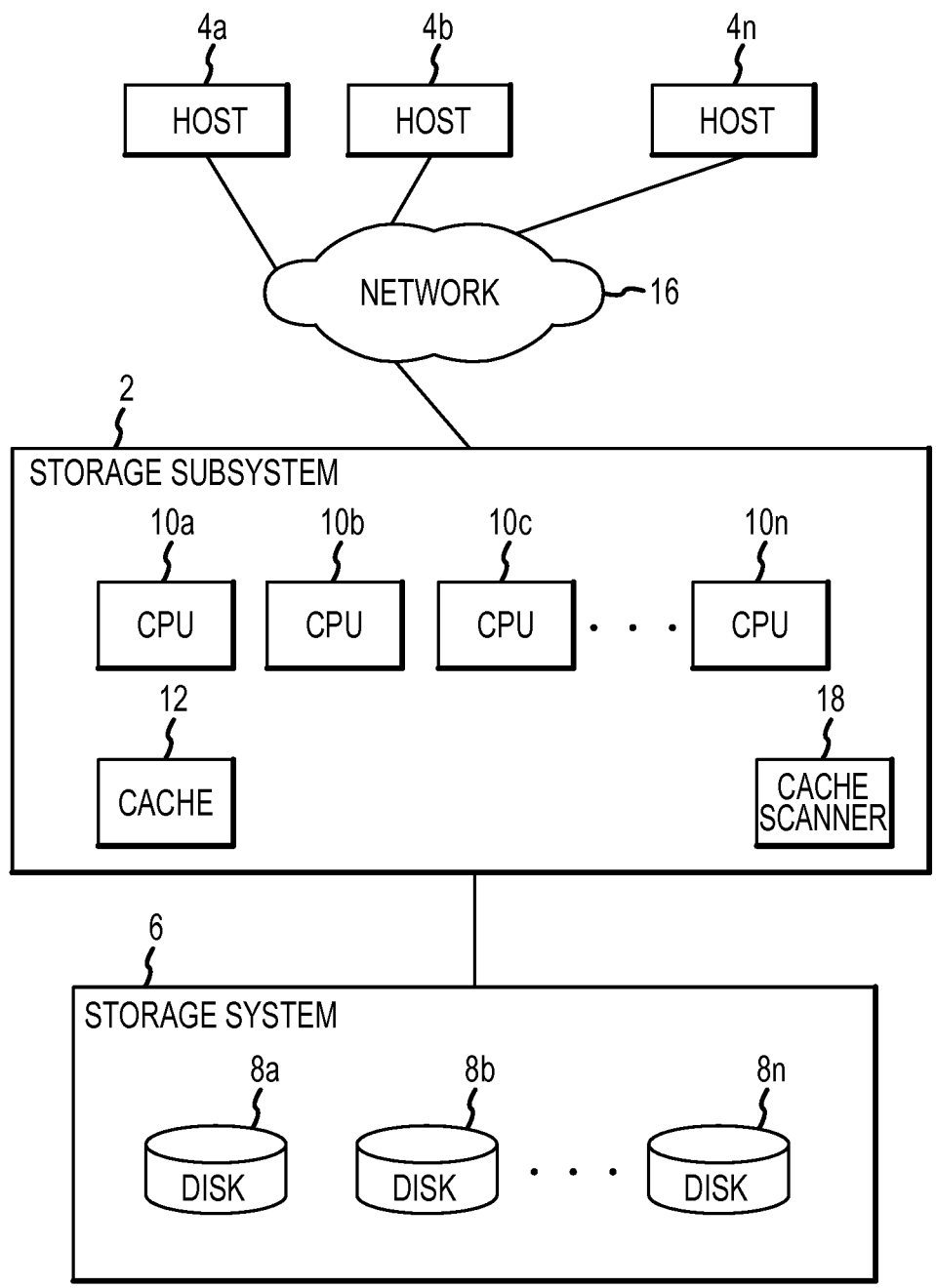
FIG. 1 illustrates a first computing environment in which certain aspects of the invention are implemented.

FIG. 1 illustrates a processing environment in which aspects of the invention are implemented. A storage subsystem 2 receives I/O requests from hosts 4a, 4b . . . 4n directed to tracks in a storage system 6, which comprises one or more hard disk drives 8a, 8b . . . 8n. The storage system 6 and disk drives 8a, 8b . . . 8n may be configured as a DASD, one or more RAID ranks, etc. The storage subsystem 2 further includes one or more central processing units (CPUs) 10a, 10b, 10c . . . 10n and a cache 12 comprising a volatile memory to store tracks. The hosts 4a, 4b . . . 4n communicate I/O requests to the storage subsystem 2 via a network 16, which may comprise any network known in the art, such as a Storage Area Network (SAN), Local Area Network (LAN), Wide Area Network (WAN), the Internet, an Intranet, etc. The cache 12 may be implemented in one or more volatile memory devices.

A cache scanner 18 comprises either a hardware component or program executed by one or more of the CPUs 10a, 10b . . . 10n. The cache scanner 18 scans the cache 12. The cache scanner 18 may alternatively be a part of another hardware component or be included in another software program. Scanning the cache may comprise performing operations such as destaging data from the cache, discarding data from the cache, skipping over data in the cache after reading the data etc.

Figure 2:
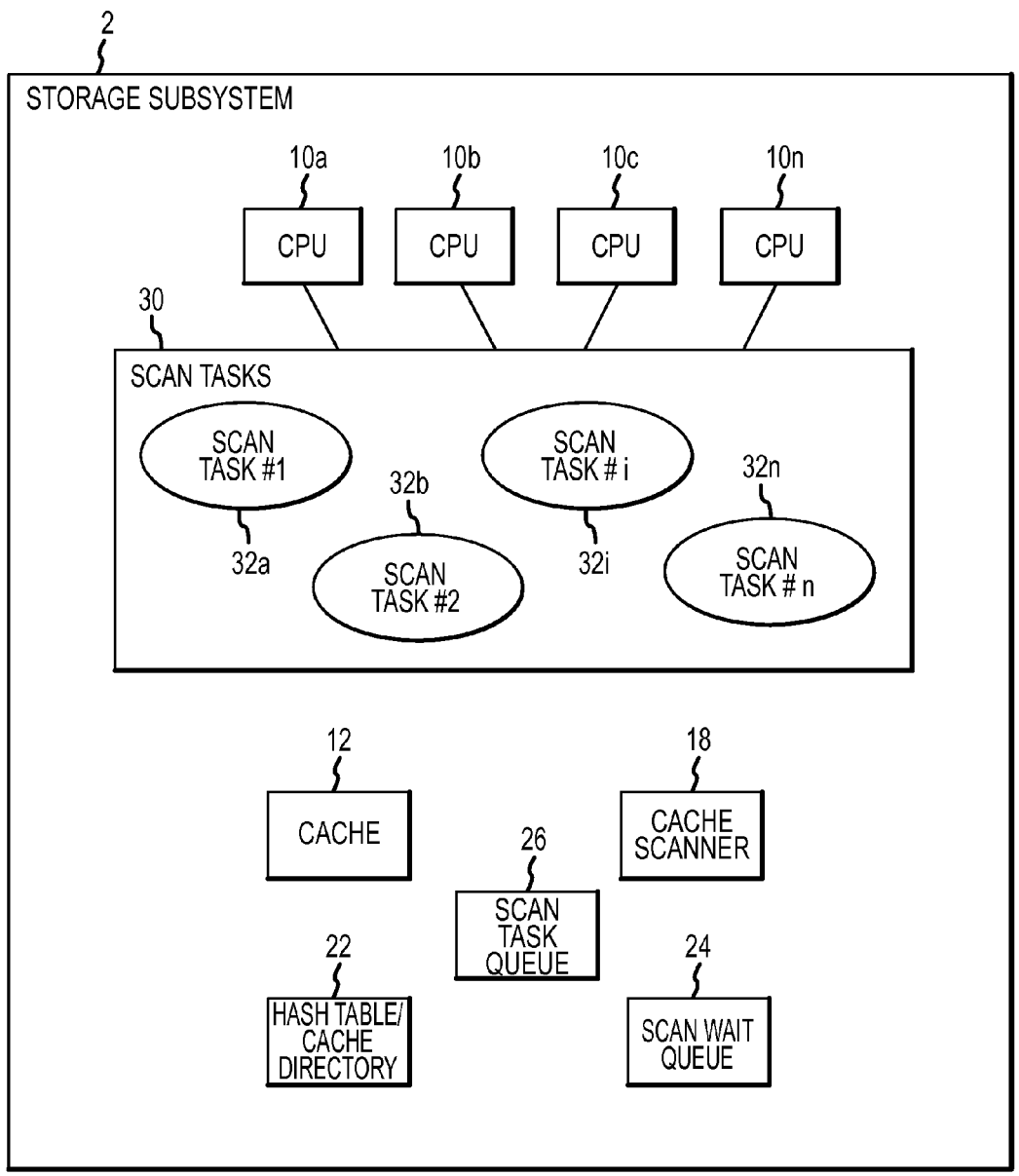
FIG. 2 illustrates program components used to scan a cache in accordance with certain implementations of the invention.

FIG. 2 illustrates program components used to scan the cache 12 in accordance with implementations of the invention. FIG. 2 illustrates a hash table 22 associated with the cache 12. The hash table 22 includes information on the cache 12, and in particular contains information regarding the tracks associated with cache 12.

The CPUs 10a, 10b . . . 10n may execute scan tasks 30 to perform various operations. The scan tasks 30 may include a plurality of scan tasks 32a, 32b . . . 32n as well as other processes. Each scan task 32a, 32b, . . . 32i, . . . 32n scans a part of the cache 12. Each scan task 32a, 32b, . . . 32n may be listed in a scan wait queue 24. Prior to execution, the scan tasks 30 are dequeued from the scan wait queue 24 to a scan task queue 26 as will be further described. In one implementation, the tasks 30 are executed on any CPU 10a, 10b . . . 10n that are available. In another implementation, the scan processes 32a, 32b, . . . 32n may execute concurrently on multiple CPUs 10a, 10b, . . . 10n. If only a single CPU is available then the processes 30 execute on the single CPU. In some implementations, the CPUs 10a, 10b, 10n may also execute other processes besides the scan tasks 32a, 32b . . . 32n.

Figure 3:
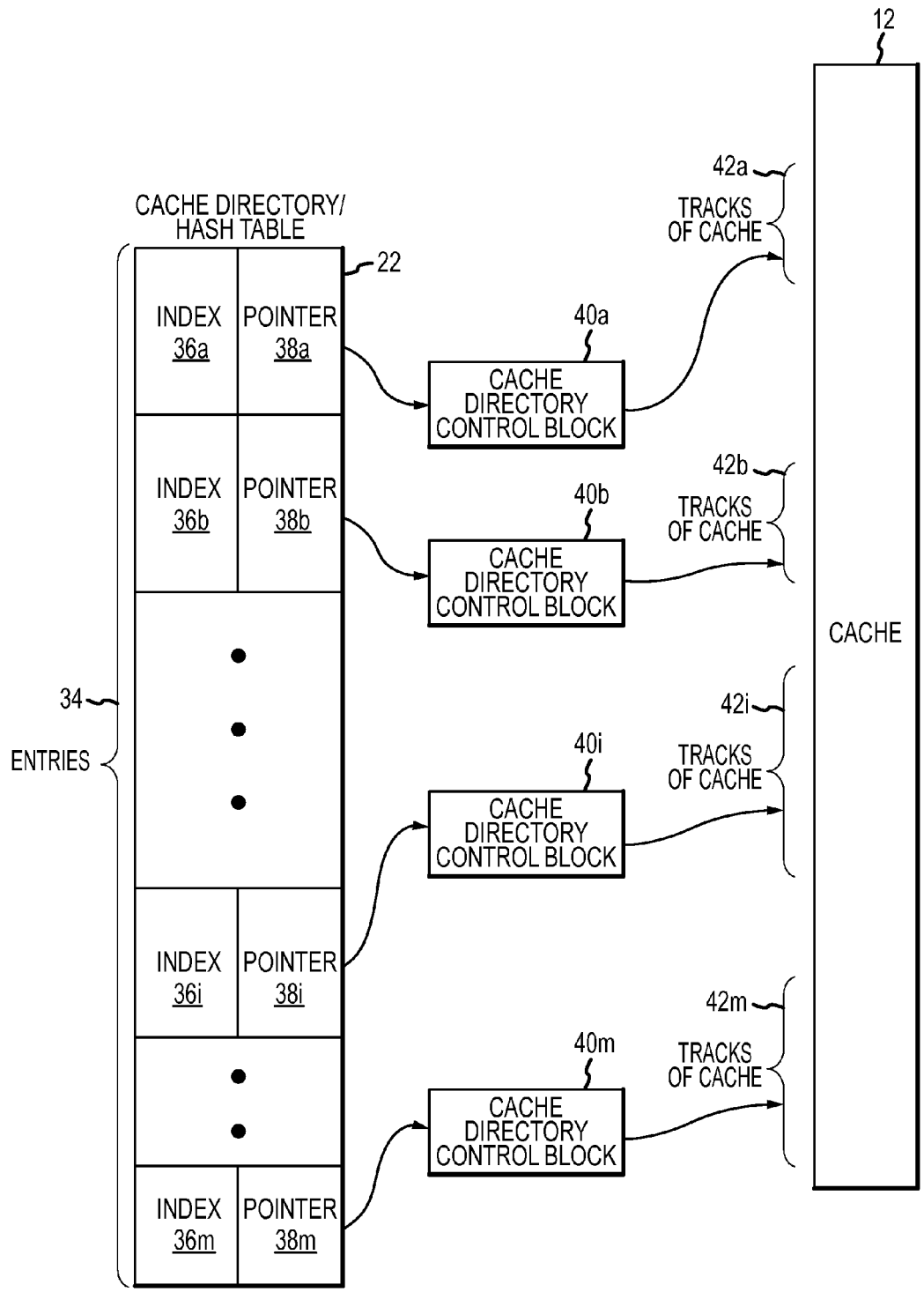
FIG. 3 illustrates the fields in a cache directory/hash table corresponding to a cache in accordance with certain implementations of the invention.

FIG. 3 illustrates the fields in the cache directory/hash table 22 corresponding to the cache 12 in accordance with certain implementations of the invention. The hash table 22 contains entries 34, where each entry has an index 36a, 36b, . . . , 36i . . . 36m and a corresponding pointer 38a, 38b, . . . 38i, . . . 38m, and where a representative index 36i is associated with a corresponding pointer 38i. Each pointer 38a, 38b, . . . 38i . . . 38m points to a corresponding cache directory control block 40a, 40b . . . 40i . . . 40m, where a representative pointer 38i points to a cache directory control block 40i. A cache directory control block 40a, 40b . . . 40i . . . 40m contains pertinent information about corresponding tracks 42a, 42b . . . 42i, . . . 42m in the cache 12, where a representative cache directory control block 40i contains all pertinent information about the corresponding tracks 42i in the cache 12. The information in the cache directory control block 40i is adequate to find all the data related to the tracks 42i in the cache 12. In aggregate, the hash table entries 34 include information on all tracks in the cache 12.

The illustrated embodiments as will be presently described introduce methodologies for grouping cache directory scans, so very few cache scans are executing at any time. These methodologies essentially combine several cache scans into a single scan, reducing the number of scans dramatically. Potentially, thousands of scans may be grouped together when needed using the present methodologies, saving a large amount of processing bandwidth.

As the skilled artisan will appreciate, some cache directory scan operations may be grouped together. An example of these scan operations are discard scans, which accompany the removal of a track from the cache. In addition, some scan operations should not be grouped together, such as commit scans since they involve a destage operation which can impede other scan operations from proceeding, and small extent scans since they only examine a small part of the directory and grouping them would cause them to look up the full cache directory.

A group of scan tasks is selected from the scan wait queue. Preferably, the group of scan tasks includes those scan operations that may be grouped together. The scan tasks making up the group may include (1) all of the scan tasks in the scan wait queue, (2) a selected number of the scan tasks in the scan wait queue, or (3), a set of similar scan tasks, such as a set of discard scans. In one embodiment, only a predetermined number N of scan tasks may be allowed to execute at any time. The scan tasks are dequeued from the scan wait queue to the scan task queue where they await execution. In one embodiment, this may be performed as a number N of task control blocks (TCBs) representative of the scan tasks are dequeued from the scan wait queue to the scan task queue.

Once a scan task finishes, a check may be made on the scan wait queue for any scan tasks remaining. If there are additional scan tasks on the queue, they may be then dequeued from the scan wait queue. In one embodiment, the scan tasks on the scan task queue and/or the scan wait queue is initially zero. The amount of scan tasks on the scan wait queue and scan task queue may vary as instructions to perform a scan operation are received, and as the scan tasks are performed.

The scan tasks on the scan wait queue may be dequeued in the same order to the scan task queue. In other words, the ordering of the scan wait queue may be preserved through to the scan task queue. In addition, the scan tasks may be organized in a different order.

Once the scan tasks are on the scan task queue, each of the scan tasks are performed in the order designated. In one or more embodiments, each individual scan task is subdivided into a number of child scan tasks. These child scan tasks may be organized one child task for each processor 10a, 10b, 10c . . . 10n (FIG. 2). For each child scan task, the full collision chain in the cache directory may be parsed, and the following actions may be performed for each track in the collision chain: (1) The track ownership may be acquired; (2) the track is checked to determine if it meets criteria for any of the scan tasks in the scan tasks queue. If none of the scan tasks meet the criteria, then the track ownership is released and a subsequent track is examined; (3) if any of the scan tasks meet the criteria, the respective processing code is applied to the scan task for the track; and (4) the track ownership is released. In the case of a discard scan task, if a track is discarded by any of the scan tasks in the scan task queue, then the remaining scan tasks for the track are not processed.

Figure 4:
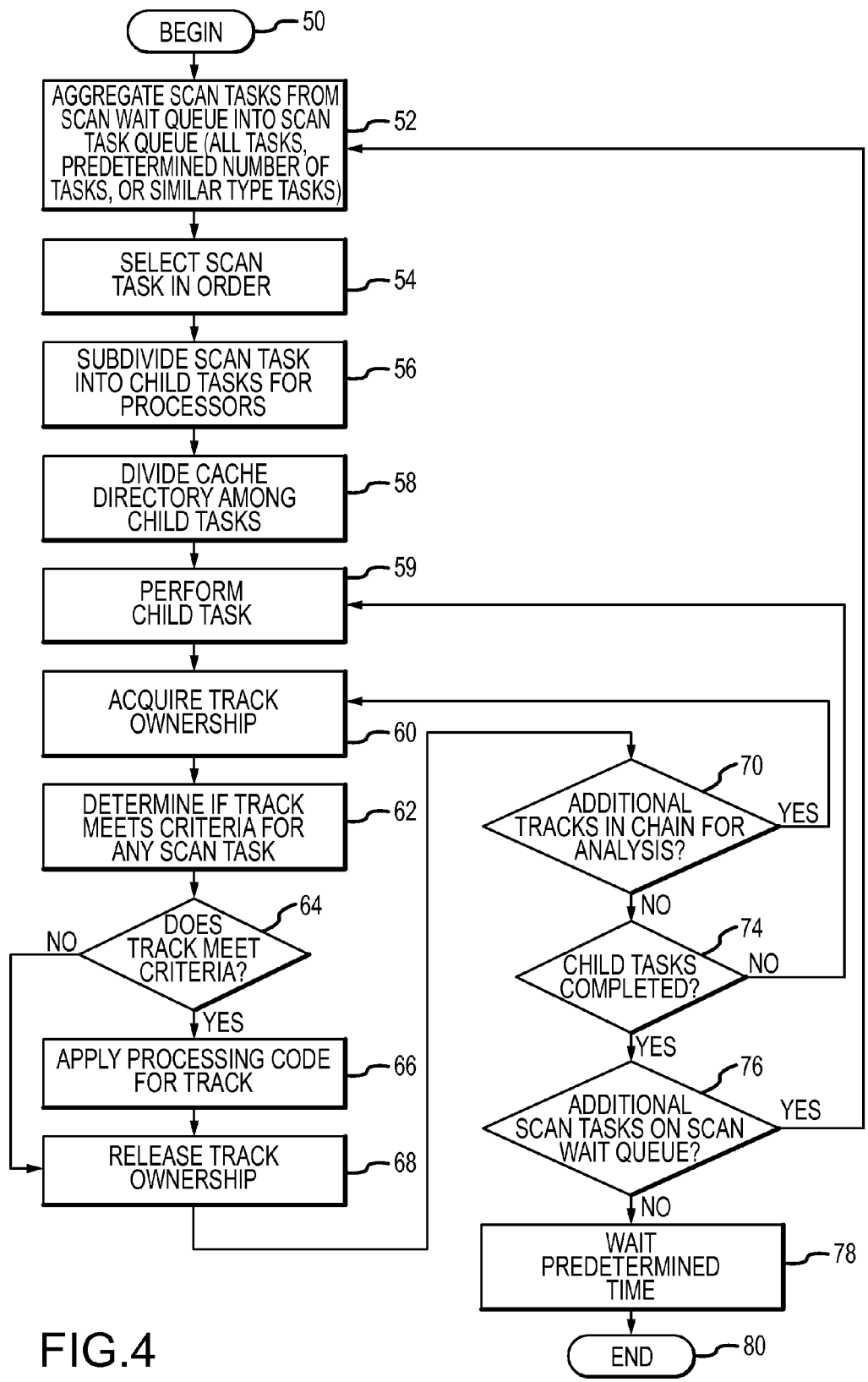
FIG. 4 is a flow chart of an exemplary method for grouping and dispatching scans in cache.

FIG. 4, following, illustrates an exemplary method for grouping and dispatching scans in cache. As one skilled in the art will appreciate, various steps in the method may be implemented in differing ways to suit a particular application. In addition, the described method may be implemented by various means, such as hardware, software, firmware, or a combination thereof operational on or otherwise associated with the processing environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

The grouping and dispatching methodology begins (step 50) with the aggregation of scan tasks from the scan wait queue into the scan task queue (step 52). Here again, the scan tasks preferably include those scan tasks with an ability to be grouped together. The scan tasks are dequeued from the scan wait queue as previously described. These scan tasks may include (1) all scan tasks on the scan wait queue, (2) a predetermined number of scan tasks on the scan wait queue, or (3) a set of similar scan tasks.

In a next step, each scan task is selected in order (step 54). The scan task is subdivided into a number of child scan tasks, one for each processor (step 56), as the cache directory is similarly subdivided (step 58). The scan task queue is passed to each child scan task, and the child scan task is performed (step 59).

For each child task, the respective track ownership is acquired (step 60). The child scan task is examined to determine if the track meets the criteria for any of the scan tasks in the scan task queue (step 62). If the track meets criteria (step 64), then the processing code for the track is applied (step 66) for the scan task. If additional scan tasks on the scan task queue meet the criteria for this track, the processing code is applied for these additional scan tasks (again, step 66). Track ownership is then released (step 68) once processing is completed.

If additional track(s) in the chain remain to be analyzed (step 70), the respective track ownership for these additional track(s) is acquired (returning to step 60) and the process continues as described previously (step 62, etc.). For each child scan task, the process is repeated until the child tasks are completed (step 74, returning to step 59 until child tasks are complete). As a next step, the scan wait queue is checked to determine if additional scan tasks are queued (step 76). If so, then additional scan tasks are dequeued from the scan wait queue to the scan task queue (again, step 52), and the process continues. If not, the system waits a predetermined time (step 78) and checks again (again, step 76). The grouping and dispatching methodology ends (step 80).

The described implementations may be implemented as a method, apparatus or computer program product using standard programming and/or engineering techniques to produce software, firmware, hardware, or any combination thereof. The term "computer program product" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.)). Code in the computer readable medium is accessed and executed by a processor. The code in which preferred embodiments are implemented may further be accessible through a transmission media or from a file server over a network. In such cases, the computer program product in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the computer program product may comprise any information bearing medium known in the art.

The exemplary methodology of FIG. 4 describes specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel.

In the described implementations, the disk drives 8a, 8b, . . . 8n comprised magnetic hard disk drives. In alternative implementations, the storage system 6 may comprise any storage system known in the art, such as optical disks, tapes, etc.

In the described implementations, the cache 12 comprised volatile memory and the storage system 6 to which tracks are destaged from cache comprised a non-volatile storage device. In alternative implementations, the cache 12 from which data is destaged and the storage to which destaged data is stored may comprise any volatile or non-volatile computer readable medium known in the art.

In the described implementations, the data was managed as tracks in cache. In alternative implementations, the data may be managed in data units other than tracks, such as a logical block address (LBA), etc.

The foregoing description of the described implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for grouping and dispatching scans in a cache directory of a processing environment, comprising:
performing, by a processor device operational in the processing environment:
aggregating a plurality of scan tasks from a scan wait queue into a scan task queue, the plurality of scan tasks determined by selecting a set of scan tasks of a similar type on the scan wait queue;
selecting from the scan task queue a first scan task from the plurality of scan tasks according to an order;
subdividing the first scan task into a plurality of child tasks for each of a plurality of processors in the processing environment, the cache directory organized according to each of the plurality of child tasks;
parsing through each entry in the cache directory for each child task of the plurality of child tasks, and for each track in a collision chain of the cache directory:
acquiring a track ownership,
determining if a track meets a criteria for any of the plurality of scan tasks in the scan task queue, wherein:
if the track meets the criteria for any of the plurality of scan tasks, a processing code is applied for the track, and if the track does not meet the criteria for any of the plurality of scan tasks, the track ownership is released and a subsequent track in the collision chain is analyzed to determine if the subsequent track meets the criteria;

passing the scan task queue to each child task of the plurality of child tasks; and performing the child task of the plurality of child tasks; wherein the similar type includes discard scan tasks, and the similar type precludes commit scan tasks from being aggregated and small extent scan tasks from being aggregated.

2. The method of claim 1, further including, by the processor device, subsequent to performing the scan task, checking for an additional scan task of the plurality of scan tasks on the scan wait queue.

3. The method of claim 1, wherein only a predetermined amount of the set of similar type scan tasks may execute at a time.

4. A system for grouping and dispatching scans in a cache directory of a processing environment, comprising: a processor operational in the processing environment, the processor:

aggregates a plurality of scan tasks from a scan wait queue into a scan task queue, the plurality of scan tasks determined by selecting one of (1) each of the plurality of scan tasks on the scan wait queue, (2) a predetermined number of the plurality of scan tasks on the scan wait queue, and (3) a set of scan tasks of a similar type on the scan wait queue, selects from the scan task queue a first scan task from the plurality of scan tasks according to an order;

subdivides the first scan task into a plurality of child tasks for each of a plurality of processors in the processing environment, the cache directory organized according to each of the plurality of child tasks;

parses through each entry in the cache directory for each child task of the plurality of child tasks, and for each track in a collision chain of the cache directory:

acquires a track ownership, determines if a track meets a criteria for any of the plurality of scan tasks in the scan task queue, wherein:
if the track meets the criteria for any of the plurality of scan tasks, a processing code is applied for the track, and
if the track does not meet the criteria for any of the plurality of scan tasks, the track ownership is released and a subsequent track in the collision chain is analyzed to determine if the subsequent track meets the criteria;

passes the scan task queue to each child task of the plurality of child tasks; and performing the child task of the plurality of child tasks; wherein the similar type includes discard scan tasks, and the similar type precludes commit scan tasks from being aggregated and small extent scan tasks from being aggregated.

5. The system of claim 4, wherein the processor subsequent to performing the scan task, checks for an additional scan task of the plurality of scan tasks on the scan wait queue.

6. The system of claim 4, wherein only a predetermined amount of the set of similar type scan tasks may execute at a time.

7. A computer program product for grouping and dispatching scans in a cache directory of a processing environment, the computer program product comprising a non-transitory computer-readable storage medium having computer-readable program code portions stored therein, the computer-readable program code portions comprising:

a first executable portion that aggregates a plurality of scan tasks from a scan wait queue into a scan task queue, the plurality of scan tasks determined by selecting one of (1) each of the plurality of scan tasks on the scan wait queue, (2) a predetermined number of the plurality of scan tasks on the scan wait queue, and (3) a set of scan tasks of a similar type on the scan wait queue;

a second executable portion that selects from the scan task queue a first scan task from the plurality of scan tasks according to an order; and a third executable portion that subdivides the first scan task into a plurality of child tasks for each of a plurality of processors in the processing environment, the cache directory organized according to each of the plurality of child tasks;

a fourth executable portion that parses through each entry in the cache directory for each child task of the plurality of child tasks, and for each track in a collision chain of the cache directory:

a fifth executable portion that acquires a track ownership, a sixth executable portion that determines if a track meets a criteria for any of the plurality of scan tasks in the scan task queue, wherein:
if the track meets the criteria for any of the plurality of scan tasks, a processing code is applied for the track, and
if the track does not meet the criteria for any of the plurality of scan tasks, the track ownership is released and a subsequent track in the collision chain is analyzed to determine if the subsequent track meets the criteria;

a seventh executable portion that passes the scan task queue to each child task of the plurality of child tasks; and an eighth executable portion that performs the child task of the plurality of child tasks;
wherein the similar type includes discard scan tasks, and the similar type precludes commit scan tasks from being aggregated and small extent scan tasks from being aggregated.

8. The computer program product of claim 7, further including a ninth executable portion, subsequent to performing the scan task, that checks for an additional scan task of the plurality of scan tasks on the scan wait queue.

9. The computer program product of claim 7, wherein only a predetermined amount of the set of similar type scan tasks may execute at a time.

* * * * *